United States Patent
Sydir et al.

(10) Patent No.: US 7,543,142 B2
(45) Date of Patent: Jun. 2, 2009

(54) METHOD AND APPARATUS FOR PERFORMING AN AUTHENTICATION AFTER CIPHER OPERATION IN A NETWORK PROCESSOR

(75) Inventors: Jaroslaw J. Sydir, San Jose, CA (US); Kamal J. Koshy, Milpitas, CA (US); Wajdi Feghali, Boston, MA (US); Bradley A. Burres, Cambridge, MA (US); Gilbert M. Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 892 days.

(21) Appl. No.: 10/741,676

(22) Filed: Dec. 19, 2003

(65) Prior Publication Data

US 2005/0138368 A1  Jun. 23, 2005

(51) Int. Cl.
 *H04L 9/00* (2006.01)
(52) U.S. Cl. .................................................. 713/161
(58) Field of Classification Search ................. 713/161
 See application file for complete search history.

(56) References Cited

U.S. PATENT DOCUMENTS

| | | | | |
|---|---|---|---|---|
| 5,377,270 | A * | 12/1994 | Koopman et al. | 380/262 |
| 6,061,449 | A * | 5/2000 | Candelore et al. | 380/28 |
| 6,295,604 | B1 * | 9/2001 | Callum | 713/160 |
| 6,363,444 | B1 * | 3/2002 | Platko et al. | 710/110 |
| 6,785,390 | B1 * | 8/2004 | Hiraide | 380/262 |
| 6,971,006 | B2 * | 11/2005 | Krishna et al. | 713/161 |
| 7,073,067 | B2 * | 7/2006 | Mizrah | 713/183 |
| 7,082,534 | B2 * | 7/2006 | Tardo | 713/161 |
| 2002/0062444 | A1 * | 5/2002 | Law | 713/189 |
| 2002/0108048 | A1 * | 8/2002 | Qi et al. | 713/189 |
| 2002/0188871 | A1 * | 12/2002 | Noehring et al. | 713/201 |
| 2003/0108205 | A1 * | 6/2003 | Joyner et al. | 380/277 |
| 2003/0118185 | A1 * | 6/2003 | Lambert | 380/263 |
| 2004/0019782 | A1 * | 1/2004 | Hawkes et al. | 713/161 |
| 2004/0019783 | A1 * | 1/2004 | Hawkes et al. | 713/161 |
| 2004/0039936 | A1 * | 2/2004 | Lai | 713/201 |
| 2004/0117642 | A1 * | 6/2004 | Mowery et al. | 713/193 |
| 2004/0131186 | A1 * | 7/2004 | Kasuya et al. | 380/255 |
| 2004/0250095 | A1 * | 12/2004 | Feldman | 713/191 |

OTHER PUBLICATIONS

"Intel IXP2850 Network Processor: High-speed, secure content processing in a single chip." Intel Corporation 2002. http://www.intel.com/design/network/prodbrf/25213601.pdf p. 1-6.*

* cited by examiner

*Primary Examiner*—Kambiz Zand
*Assistant Examiner*—Teshome Hailu
(74) *Attorney, Agent, or Firm*—Daly, Crowley, Mofford & Durkee, LLP

(57) ABSTRACT

A method and apparatus is described for processing of network data packets by a network processor having cipher processing cores and authentication processing cores which operate on data within the network data packets, in order to provide a one-pass ciphering and authentication processing of the network data packets.

17 Claims, 3 Drawing Sheets

METHOD AND APPARATUS FOR PERFORMING AN AUTHENTICATION AFTER CIPHER OPERATION IN A NETWORK PROCESSOR

CROSS REFERENCE TO RELATED APPLICATIONS

Not Applicable

STATEMENT REGARDING FEDERALLY SPONSORED RESEARCH Not Applicable

FIELD OF THE INVENTION

This invention relates generally to network processors and more particularly to a method and apparatus for scheduling cipher processing and authentication processing in a programmable network processor.

BACKGROUND OF THE INVENTION

As is known in the art, there is a trend to provide network processors that perform cryptographic processing of network packets. To facilitate the cryptographic processing, the network processors include cryptographic acceleration units (also referred to as "crypto units"). The crypto units accelerate the cryptographic processing of packet data to support cryptographic processing at network line rate. One example of a network processor including such a crypto unit is the INTEL® IXP2850 network processor manufactured by Intel Corporation.

Two types of cryptographic processing that are commonly performed on network packets are authentication processing (or more simply authentication) and ciphering processing (or more simply ciphering). Authentication is the process of creating a digest of the packet called a MAC (message authentication code), which is sent along with the packet, and which allows the receiver to verify that the packet was indeed sent by the sender (rather than by some third party) and was not modified in transit. Ciphering is the process of encrypting or decrypting the packet, so that only the intended receiver, with the correct cryptographic key, can decrypt the packet and read its contents. Commonly used security protocols perform both ciphering and authentication on each network packet.

Known cipher algorithms include, but are not limited to, 3DES, AES, and RC4 cipher algorithms. The 3DES and AES algorithms are block cipher algorithms, which means that they process data in discrete blocks. The processing block size of the 3DES algorithm is 8 bytes, the processing block size of the AES algorithm is 16 bytes, and the RC4 algorithm is a stream cipher and processes data one byte at a time. These are but some of many cipher algorithms, and have processing block sizes representative of other cipher algorithms.

Known authentication algorithms include, but are not limited to, MD5, SHA1, and AES-XCBC-MAC authentication algorithms. All of these are block-oriented algorithms. The processing block size of the MD5 and SHA1 algorithms is 64 bytes, while the AES-XCBC-MAC algorithm uses a block size of 16 bytes. These are but some of many authentication algorithms, and have processing block sizes representative of other authentication algorithms. It should be appreciated that the length of a network data packet is not required to be a multiple of the block size of a particular cipher or authentication algorithm.

Known security protocols such as IPSEC provide part of the data in a network packet that is subject to ciphering and authentication, while another part of the data is subject only to authentication. The data that is subject only to authentication generally appears at the beginning of the packet. Other security protocols have a similar requirement that part of the data in a network packet is subject to ciphering and authentication, while another part of the data is subject only to authentication.

It should be appreciated that different security protocols can have different size headers associated with a network packet and that the amount of data subject to authentication only is not necessarily a multiple of the block size of the cipher and/or authentication algorithm.

Network packet data subject to ciphering and authentication can have two varieties. In a first variety, as discussed more fully below, incoming unencrypted data subject to ciphering and authentication (to be encrypted) can be ciphered and then sequentially processed by the authentication core. In a second variety, incoming encrypted data subject to ciphering and authentication (to be decrypted) can be processed by both the authentication and cipher cores substantially in parallel. Whether the ciphering and the authentication operations are performed sequentially or in parallel can depend not only on whether packets are to be encrypted or decrypted, but can also depend on the specific security protocol used, for example IPSec.

Once ciphered with the cipher core, data that is ciphered and not yet processed by the authentication core can be referred to as ciphered-network-packet data subject to authentication. Therefore, for a network data packet associated with a security protocol, different types of data exist, including network packet data subject to authentication and ciphering, network packet data subject only to authentication, and ciphered-network-packet data subject to authentication.

In order to provide both cipher processing and authentication processing, some prior art techniques employ a two-pass approach. In the two-pass approach, a network packet is processed in a first pass with cipher processing of network packet data subject to ciphering and authentication. The network packet is then processed in a second pass with authentication processing of the resulting ciphered-network-packet data subject to authentication along with network packet data subject only to authentication. As networks become faster, the two-pass approach tends to limit throughput of network packets. In order to perform both ciphering and authentication at a high data rate, it would be desirable to perform both operations in one pass.

Therefore, it would be desirable to overcome the aforesaid and other disadvantages, and to provide a method and apparatus that can process a network packet data in a security protocol having ciphering and authentication, at full network line speed. It would be further desirable to provide the method and apparatus that is readily adaptable to processing with any cipher algorithm and any authentication algorithm.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the method and apparatus for performing authentication after cipher, some introductory concepts and terminology are explained. As used herein, the term "data" refers to any portion of a network packet, including but not limited to, header information, source address information, destination address information, and user data. The network packet can be in any format, including, but not limited to IP, TCP/IP, and Ethernet.

Also, as used herein, the terms "network packet data subject to ciphering and authentication," "network packet data subject only to authentication," and "ciphered-network-packet data subject to authentication," are distinct types of data associated with a security protocol and with a network packet as described by the terms and as further described below. It will become apparent from discussions below that the network packet data subject to ciphering and authentication can have two varieties, a first variety in which the ciphering and the authentication are performed sequentially upon received unencrypted network packet data, and a second variety in which the ciphering and the authentication are performed substantially in parallel upon received encrypted network packet data.

As used herein, "ciphering" refers both to encrypting and decrypting data associated with a network packet.

Figure 1:
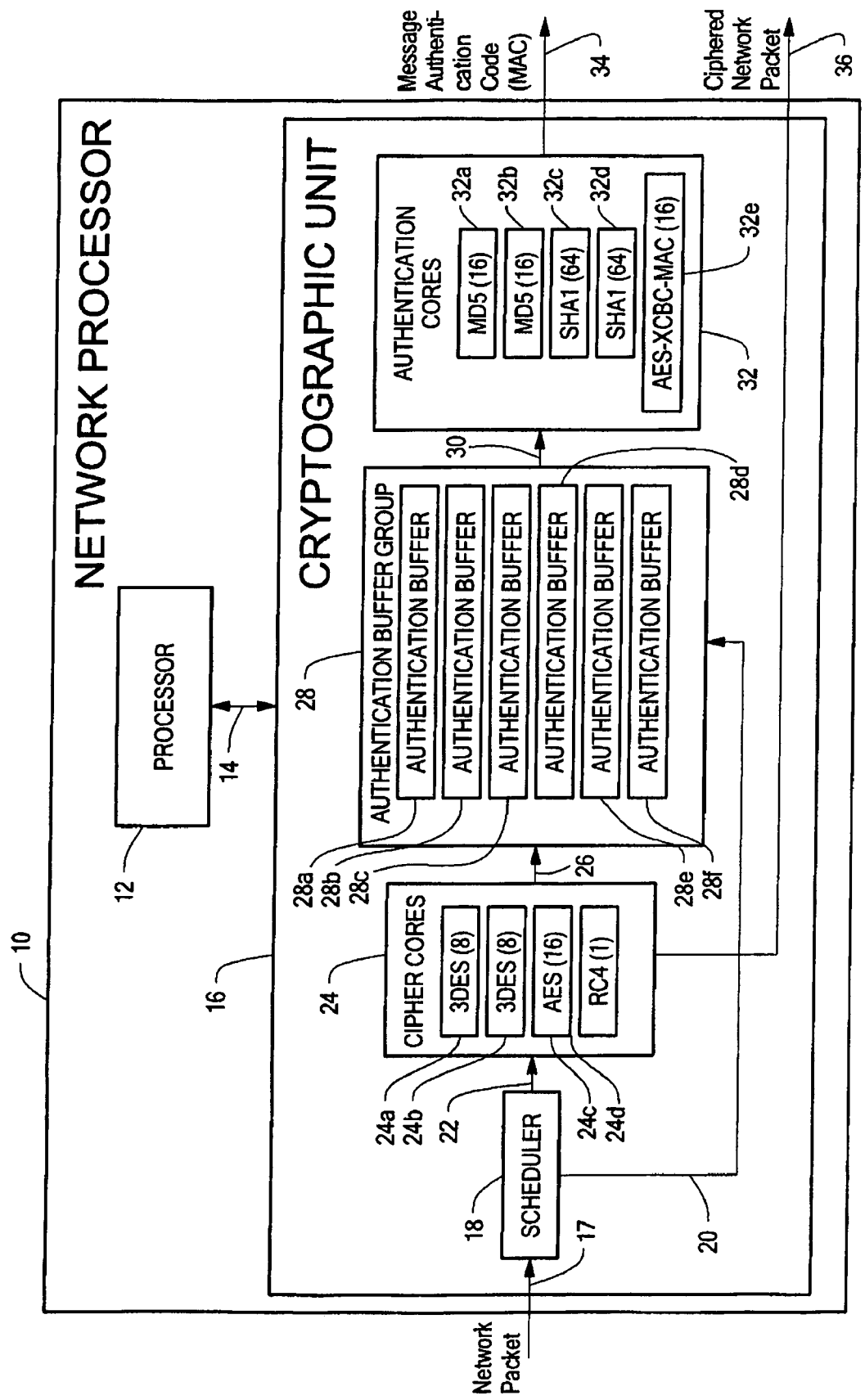
FIG. 1 is a block diagram of an exemplary embodiment of a network processor having an authentication buffer.

Referring now to FIG. 1, an exemplary network processor 10 includes a cryptographic unit 16 having a scheduler 18 adapted to receive network packets 17. The scheduler 18 is coupled to a cipher core group 24 and to an authentication buffer group 28. As described above, security protocols such as IPSEC require that part of the data in a network packet is subject to authentication and ciphering, and part of the data is subject only to authentication. Thus, the scheduler 18 directs portions of the network packets along selected paths 20, 22. The scheduler 18 directs the first variety of network packet data subject to ciphering and authentication, for which ciphering and authentication are to be performed sequentially as described above, along the path 22 to a selected cipher core within the cipher core group 24. The scheduler 18 also directs the second variety of network packet data subject to ciphering and authentication, for which ciphering and authentication are to be performed substantially in parallel as described above, along the path 22 to the cipher core group 24 and also along a path 20 to a selected authentication buffer within an authentication buffer group 28. The scheduler 18 further directs network packet data subject only to authentication (no ciphering) along the path 20 to the selected authentication buffer within an authentication buffer group 28. It will be understood that the network packet data subject only to authentication is also directed elsewhere in the network processor 10, though not explicitly shown.

In the exemplary network processor 10 of FIG. 1, the cipher core group 24 include two 3DES cipher cores 24a, 24b, respectively, using a 3DES algorithm, one AES cipher core 24c using an AES algorithm, and one RC4 cipher core 24d using an RC4 algorithm. As described above, the processing block size of the 3DES algorithm is 8 bytes, the processing block size of the AES algorithm is 16 bytes, and the RC4 algorithm performs a stream cipher, which processes data one byte at a time.

The cipher core group 24 provides ciphered-network-packet data subject to authentication along a path 26 to the selected authentication buffer with the authentication buffer group 28. The cipher core group 24 also transmits ciphered network packet data out of the cryptographic unit 16 along path 36.

It will therefore be understood that the selected authentication buffer stores "authentication data" including at least one of ciphered-network-packet data subject to authentication, network packet data subject only to authentication, and network packet data subject to ciphering and authentication.

Blocks of the authentication data are provided along a path 30 from the authentication buffer group 28 to a selected authentication core within an authentication core group 32. The authentication core group 32 includes two MD5 cores 32a, 32b using an MD5 algorithm, two SHA1 cores 32c, 32c using an SHA1 algorithm, and one AES-XCBC-MAC core 32e using an AES-XCBC-MAC algorithm. As described above, the processing block size of the MD5 and SHA1 algorithms is 64 bytes, while the AES-XCBC-MAC algorithm uses a block size of 16 bytes. Message authentication codes (MACs) 34 that result from the authentication operation performed on a packet are provided by the authentication core group 32.

The authentication buffer, e.g., authentication buffer 28a, provides a means of operating with the cipher cores 24a-24d and with authentication cores 32a-32f having different processing block sizes, while maintaining a consistent throughput at network line speed. The function of the authentication buffers 28a-28f will become apparent in conjunction with figures below.

A processor 12 provides commands along a path 14, which control the scheduler 18 to provide the portions of the network packets which require ciphering and authentication and the portions of the network packets requiring only authentication along the paths 22, 20, respectively, as described above. The processor 12 also provides commands to select a cipher core 24a-24d from among the cipher core group 24, an authentication buffer 28a-28f from among the authentication buffer group 28, and an authentication core 32a-32f from among the authentication core group 32.

Having more than one authentication buffer in the authentication buffer group 28 allows parallel operations to be performed upon multiple network packets at the same time, therefore tending to increase throughput speed.

The authentication buffers 28a-28e decouple and speed match the operation of the cipher cores 24a-24d and the operation of the authentication cores 32a-32e, which can operate at different data rates and on blocks of data having different sizes. Each authentication buffer 28a-28f is sized to hold at least a largest block of data associated with any of the supported authentication algorithms, plus a largest block of data associated with any of the supported cipher algorithms. For the exemplary embodiment shown in FIG. 1, MD5 and SHA1 have a block size of 64 bytes and AES-XCBC-MAC has a block size of 16 bytes, so at least one of the authentication buffers 28a-28f must hold at least 64 bytes of network packet data subject only to authentication (i.e., from path 20) plus at least 16 bytes of ciphered-network-packet data subject to authentication (i.e., from path 26). Therefore, for the exemplary embodiment shown in FIG. 1, each of the authentication buffers 28a-28f includes at least eighty bytes. However, in other embodiments, one or more of the authentication buffers 28a-28f can have more than or fewer than eighty bytes, in accordance with supported cipher and authentication algorithms.

In order to support the ciphering network packets, the exemplary cryptographic unit 16 has six processing "contexts" and six corresponding authentication buffers 28a-28f, which are each used to process one packet at a time. A processing context corresponds to a variety of information, including a cipher key and intermediate ciphering/authentication results associated with the processing of one packet. Multiple processing contexts and a corresponding plurality of authentication buffers allow any latency generated by loading of cryptographic key material and packet data to be hidden. In essence, the cryptographic unit 16 is pipelined, allowing the loading of data and key material associated with some of the contexts concurrently with processing of data associated with other contexts. This allows the cryptographic unit 16 to achieve a high throughput.

It should be understood that although in the exemplary embodiment of FIG. 1, the cipher core group 24 is comprised of four cipher cores 24a-24d, in other embodiments the cipher core group 24 can have more that four or fewer than four cipher cores, and can also have different cipher cores, operating with different cipher algorithms than those shown. Also, it should be understood that although in the exemplary embodiment of FIG. 1, the authentication core group 32 is comprised of five cores 32a-32e, in other embodiments the authentication core group 32 can have more than five or fewer than five authentication cores, and can also have also different authentication cores, operating with different authentication algorithms than those shown. Also, in other embodiments, the network processor 10 can have more than one cryptographic unit 16, and each of the cryptographic units can be the same or different, for 10 example supporting the same or different cipher and/or authentication algorithms. In one exemplary embodiment, the network processor 10 has two cryptographic units 16, each as shown. The maximum number of cryptographic units 16, the maximum number of cores, and the maximum number of authentication buffers which can be included in a in the network processor 10 is limited only by practical manufacturing considerations, e.g., maximum practical silicon die area.

While six authentication buffers are shown, it should also be appreciated that more than six or fewer than six authentication buffers can be used. The number of authentication buffers to use is selected in accordance with a desired number or processing contexts resulting in a corresponding number of authentication buffers being loaded and/or processed in parallel.

Figure 2:
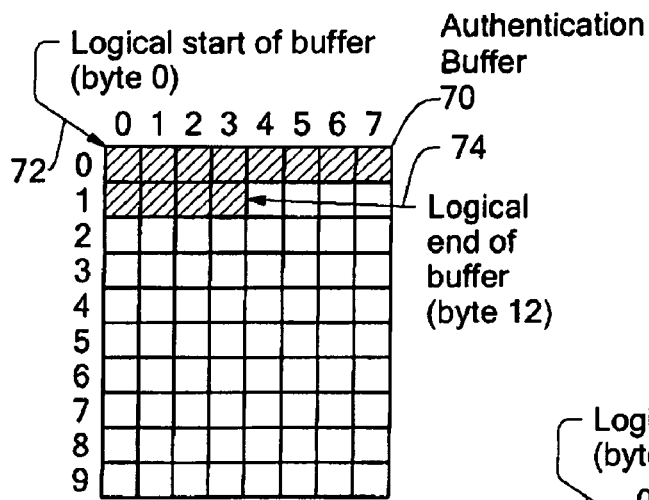
FIG. 2 is a block diagram of an exemplary authentication buffer in a first state.
Figure 2A:
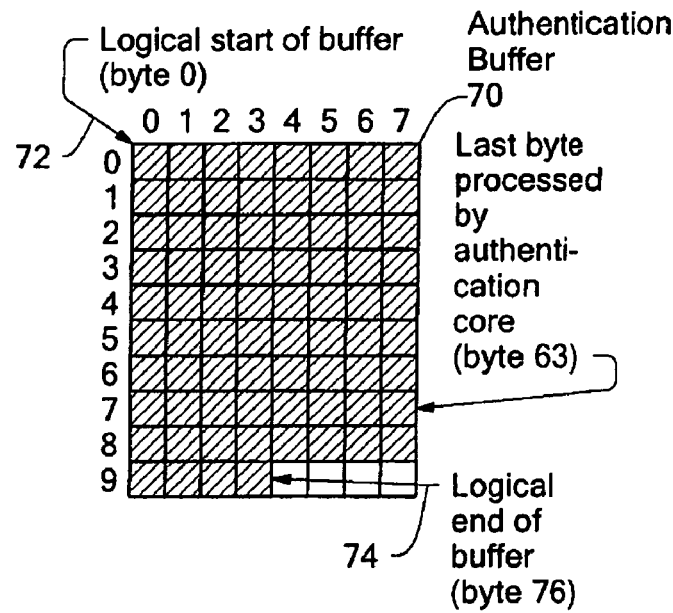
FIG. 2A is a block diagram of the exemplary authentication buffer of FIG. 2 in a second state.
Figure 2B:
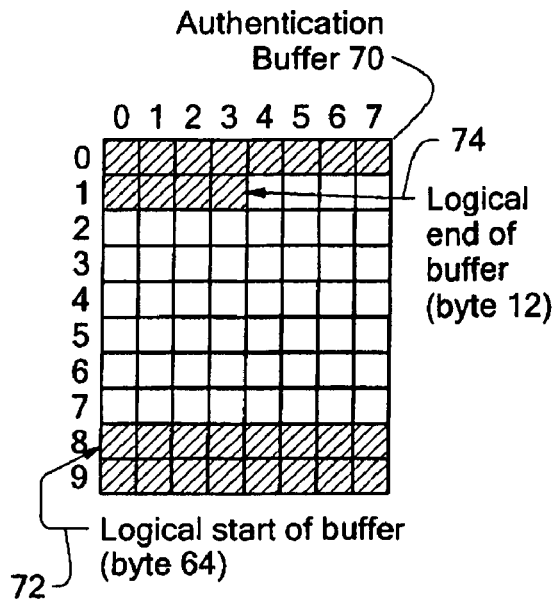
FIG. 2B is a block diagram of the exemplary authentication buffer of FIG. 2 in a third state.

Referring now to FIGS. 2-2B, a table 70 represents eighty byte locations corresponding to one of the authentication buffers 28a-28f of FIG. 1, and will be referred to herein as an authentication buffer 70.

The authentication buffer 70 is arranged as a circular first-in-first-out (FIFO) memory. The FIFO structure allows the block size of the data being written to the buffer to be different from the block size of the data being read from the buffer. This allows a write operation to provide more data than is required by an authentication core, e.g., authentication core 32a of FIG. 1, while the authentication core reads the data block. A start of data pointer 72, corresponding to a logical start of the authentication buffer 70, is associated with a start of data within the authentication buffer 70. An end of data pointer 74, corresponding to a logical end of the authentication buffer 70, is associated with an end of data within the authentication buffer 70. The start of data pointer 72 points to a start of the next data block to be processed by the authentication core (e.g., authentication core 32a, FIG. 1), and the end of data pointer 74 points to a next byte location to which data will be written.

When enough data has accumulated in the authentication buffer 70 to fill a data block, required by an authentication algorithm associated with the authentication core, then the block of data is read from the authentication buffer 70 and sent to an authentication core, e.g., authentication core 32a, of FIG. 1, for authentication processing. A sufficient block of data can be identified by sufficient separation between the start of data pointer 72 and the end of data pointer 74. It should be recognized that the block of data need not actually be removed from the authentication buffer 70. Rather, merely moving the start of data pointer 72 effectively removes the data block from further processing.

Further operation of the authentication buffer 70 is described in terms of an example. In operation, initially the start of data pointer 72 and the end of data pointer 74 each point to the first physical byte of the authentication buffer 70 (byte 0). In one example, 12 bytes of network packet data subject only to authentication are loaded into the authentication buffer 70 and the end of data pointer 74 is moved to byte 12 accordingly. In FIG. 2, crosshatched boxes represent bytes into which data has been loaded, but not yet processed by an authentication core.

Referring now to FIG. 2A, continuing with the above example, another 64 bytes of data (four 16-byte blocks) are written to the authentication buffer 70. The authentication buffer 70 now contains 76 bytes of data, enough data for an authentication algorithm to start processing. The end of data pointer 74 is moved accordingly to the next byte to which data can be written, which is here byte 76.

When the authentication buffer 70 contains sufficient data to begin authentication processing, a block of data is processed, which is here 64 bytes. The authentication core processes 64 bytes of data starting at the start of data pointer 72. In this example, therefore, the authentication core processes bytes 0 through 63.

When the authentication core has processed the data, the start of data pointer 72 is advanced to point to byte 64 and the end of data pointer 74 remains at byte 76.

Referring now to FIG. 2B, when another 16-byte block of data arrives, for example from the cipher core 28a of FIG. 1 as ciphered-network-packet data subject to authentication, four bytes are written at the end of the authentication buffer 70 and the remaining 12 bytes are written starting at the (physical) beginning of the authentication buffer 70. Also, the end of data pointer 74 is moved accordingly to byte 12. When 64 bytes have accumulated in the buffer, the authentication core again processes the block of data. The first 16 bytes of that block will be read from physical locations 64-79. The remaining 48 bytes will be read from physical locations 0-47. This process continues until the processing of a network data packet is complete.

It should be understood that though the authentication buffer 70 can have a fixed physical size, for example, eighty bytes, by means of the start of data pointer 72 and the end of data pointer 74, the actual number of bytes used in the circular FIFO structure can be changed or programmed to have any length of eighty bytes or less. The programming can be provided, for example, by the processor 12 of FIG. 1. In other embodiments, the authentication buffer 70 can include more than eighty or fewer than eighty bytes In one particular embodiment, the authentication buffer 70 is implemented as an 80-byte circular FIFO using byte-writeable register files. Register files allow new network packet data to be written into the authentication buffer 70 byte-by-byte as they arrive without having to shift the data through an accumulation buffer.

Register files, which in one embodiment, are used to implement the circular FIFO authentication buffer 70, use a smaller amount of integrated circuit die area than flip-flop structures. Typically, an implementation using register files is two or three times more die area efficient than an implementation using flops. As is known, register files are composed of memory cells, decoders, and read/write circuitry. Register files use memory cells, which are approximately one third the size of flip-flops. In addition, data read from a register file does not need to be multiplexed between outputs of flip-flops. For register files, multiplexing is performed very efficiently by a register file bit line structure. Therefore, register files require a smaller integrated circuit die area than flip-flops.

It should be appreciated that the example described in conjunction with FIGS. 2-2B performs both the ciphering operation and the authentication operation in one pass, i.e., a network packet is processed once, and therefore performs the ciphering and authentication processing rapidly.

Figure 3:
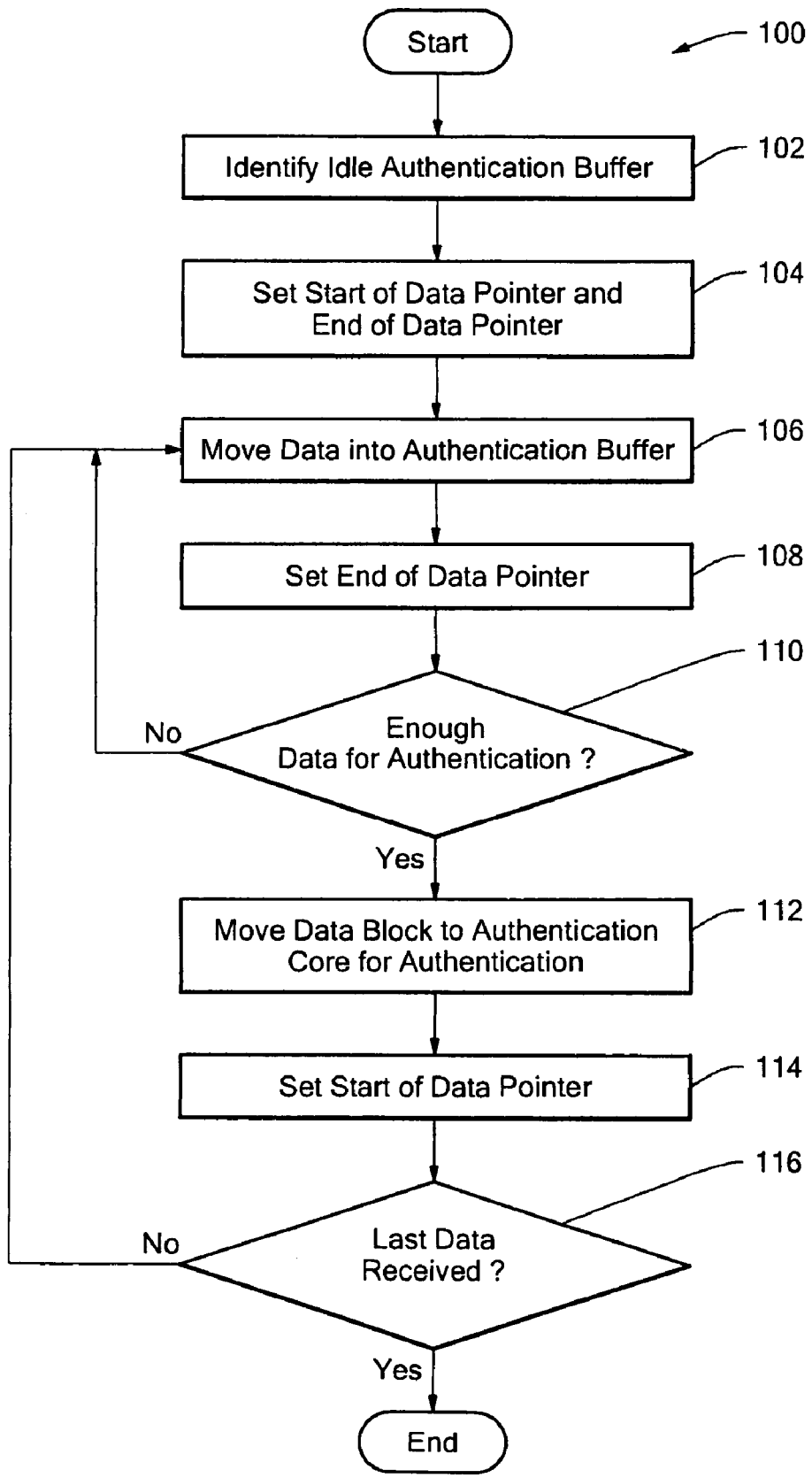
FIG. 3 is a flow chart showing a process of using an authentication buffer.

Referring now to FIG. 3, a process 100 for providing and using a circular FIFO authentication buffer, e.g., authentication buffer 70 of FIGS. 2-2B, begins at step 102, where an authentication buffer (e.g., authentication buffer 32a, FIG. 1) is selected from among a group of authentication buffers (e.g., 32, FIG. 1). The selection can be based upon a variety of criteria, including, but not limited to, selection of an idle authentication buffer.

At step 104 a start of data pointer and end of data pointer are set to point to the start of the authentication buffer, as described above in conjunction with FIG. 2.

At step 106, one or more blocks of network packet data are moved to the selected authentication buffer selected at step 102. This data can be network packet data subject only to authentication as provided along the path 20 of FIG. 1, network packet data subject to ciphering and authentication as provided along the path 20 of FIG. 1, ciphered-network-packet data subject to authentication as provided along path 26 of FIG. 1, or padding data required at the end of the packet in order to make the length of the data processed by the authentication core a multiple of the authentication algorithm block size. The order in which these different types of data are received is controlled by software running on the processor 12 (FIG. 1). The order depends on the protocol (e.g., IPSEC or SSL) and on the operation (encryption or decryption) being performed.

At step 108, an end of data pointer is set to point to a location immediately after the end of data within the authentication buffer, to the next location to which data can be written.

At step 110, a decision is made as to whether there is enough data in the selected authentication buffer to allow a selected authentication core, having a predetermined authentication algorithm associated with a predetermined data block size, to operate on the data within the selected authentication buffer. If there is not enough data, the process returns to step 106. If enough data has been received the process proceeds to step 112.

At step 112 a data block corresponding in size to the predetermined data block size is moved to an authentication core (e.g., authentication core 32a, FIG. 1) for authentication processing.

At step 114, the start of data pointer is set in accordance with the data block being moved to an authentication core at step 112, as described above in conjunction with FIGS. 2-2B At step 116 a decision is made as to whether the last data has been received from a network data packet. If the last data has been received, the process ends. If the last network data has not yet been received, the process returns to step 106.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A processor, comprising:
   an authentication buffer configured to store authentication data including ciphered-network-packet data subject to authentication, network packet data subject only to authentication and not to ciphering, and network packet data subject to ciphering and authentication, wherein the authentication buffer includes a circular first-in-first-out (FIFO) arrangement; and
   at least one authentication core coupled to the authentication buffer to authenticate the authentication data from the authentication buffer.

2. The processor of claim 1, wherein the circular FIFO arrangement includes a moveable start of data pointer and a moveable end of data pointer.

3. The processor of claim 1, wherein the network processor further includes at least one cipher core adapted to operate with a cipher algorithm and the at least one authentication core is adapted to operate with an authentication algorithm, and a size of the authentication buffer is selected in accordance with a data block size associated with the cipher algorithm and a data block size associated with the authentication algorithm.

4. The processor of claim 1, wherein the authentication core is adapted to authenticate the authentication data from the authentication buffer as blocks of authentication data.

5. A network, comprising:
   a network processor comprising:
      an authentication buffer configured to store authentication data comprising ciphered-network-packet data subject to authentication, network packet data subject only to authentication and not to ciphering, and network packet data subject to ciphering and authentication, wherein the authentication buffer includes a circular first-in-first-out (FIFO) arrangement; and
      at least one authentication core coupled to the authentication buffer to authenticate the authentication data from the authentication buffer.

6. The network of claim 5, wherein the circular FIFO arrangement includes a moveable start of data pointer and a moveable end of data pointer.

7. The network of claim 5, wherein the network processor further includes at least one cipher core adapted to operate with a cipher algorithm and the at least one authentication core is adapted to operate with an authentication algorithm, and a size of the authentication buffer is selected in accordance with a data block size associated with the cipher algorithm and a data block size associated with the authentication algorithm.

8. The network of claim 5, wherein the authentication core is adapted to authenticate the authentication data from the authentication buffer as blocks of authentication data.

9. A method of authenticating network packet data, comprising:

moving to an authentication buffer authentication data, the authentication buffer configured to store the authentication data comprising ciphered-network-packet data subject to authentication, network packet data subject only to authentication and not to ciphering, and network packet data subject to ciphering and authentication, wherein the authentication buffer includes a circular first-in-first-out (FIFO) arrangement; and moving to an authentication core a block of data from the authentication buffer.

10. The method of claim 9, wherein the moving to an authentication buffer authentication data comprises selecting the authentication buffer from among a plurality of authentication buffers.

11. The method of claim 9, further including:
setting a start of data pointer and an end of data pointer to respective initial locations;
setting the end of data pointer in accordance with the moving the authentication data to the authentication buffer; and
setting the start of data pointer in accordance with the moving to the authentication core the block of data from the authentication buffer.

12. The method of claim 9, wherein the circular first-in-first-out (FIFO) arrangement includes a moveable start of data pointer and a moveable end of data pointer.

13. The method of claim 9, further including:
providing a cipher core adapted to operate with a cipher algorithm;
providing the authentication core adapted to operate with an authentication algorithm, and
sizing the authentication buffer in accordance with a data block size associated with the cipher algorithm and a data block size associated with the authentication algorithm.

14. A computer storage readable medium that stores instructions thereon to authenticate network packet data, the instructions causing a machine to:
move to an authentication buffer authentication data, the authentication buffer configured to store the authentication data comprising ciphered-network-packet data subject to authentication, network packet data subject only to authentication and not to ciphering, and network packet data subject to ciphering and authentication, wherein the authentication buffer includes a circular first-in-first-out (FIFO) arrangement; and move to an authentication core a block of data from the authentication buffer.

15. The medium of claim 14, wherein the instructions causing a machine to move to an authentication buffer authentication data comprises instructions causing a machine to select the authentication buffer from among a plurality of authentication buffers.

16. The medium of claim 14, further comprising instructions causing a machine to:
set a start of data pointer and an end of data pointer to respective initial locations;
set the end of data pointer in accordance with the moving the authentication data to the authentication buffer; and
set the start of data pointer in accordance with the instructions for moving to the authentication core the block of data from the authentication buffer.

17. The medium of claim 14, further comprising instructions causing a machine to:
provide a cipher core adapted to operate with a cipher algorithm;
provide the authentication core adapted to operate with an authentication algorithm, and
size the authentication buffer in accordance with a data block size associated with the cipher algorithm and a data block size associated with the authentication algorithm.

* * * * *